(12) United States Patent
Walker et al.

(10) Patent No.: US 7,295,805 B2
(45) Date of Patent: Nov. 13, 2007

(54) DIGITAL RF RECEIVER AND METHOD OF DYNAMICALLY ADJUSTING A MULTI-CLUSTER MEMORY BUFFER

(75) Inventors: Glenn A. Walker, Greentown, IN (US); Eric A. Dibiaso, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 377 days.

(21) Appl. No.: 10/931,453

(22) Filed: Sep. 1, 2004

(65) Prior Publication Data

US 2006/0062390 A1 Mar. 23, 2006

(51) Int. Cl.
*H04H 1/00* (2006.01)
(52) U.S. Cl. .................. 455/3.02; 455/188.1
(58) Field of Classification Search .............. 455/3.01, 455/3.02, 500, 180.1, 188.1, 345; 711/147, 711/153, 170–171; 705/14
See application file for complete search history.

(56) References Cited

U.S. PATENT DOCUMENTS 6,618,367 B1 * 9/2003 Riazi et al. ................ 370/347

2002/0184091 A1 * 12/2002 Pudar ......................... 705/14
2004/0032805 A1 * 2/2004 Schade-Buensow et al. ..... 369/47.33
2004/0116070 A1 * 6/2004 Fishman et al. ........... 455/3.02

FOREIGN PATENT DOCUMENTS

EP 0 999 661 5/2000
WO 01/19012 3/2001

OTHER PUBLICATIONS

European Search Report dated Apr. 27, 2007.

* cited by examiner

*Primary Examiner*—Nguyen T. Vo
(74) *Attorney, Agent, or Firm*—Jimmy L. Funke

(57) ABSTRACT

A digital radio receiver system and method are provided for receiving signals from multiple transmission sources and providing dynamic data buffering. The system includes an antenna for receiving signals from multiple sources, a tuner for selecting certain frequency signals, and a digital demodulator for demodulating the tuned selected signals. The system also includes a memory buffer having memory locations and capable of storing data clusters. The system further has a controller for controlling the cluster of data stored in the memory buffer. The controller selects from at least first and second clusters of data, depending strength of signal of a received buffer source.

15 Claims, 5 Drawing Sheets

DIGITAL RF RECEIVER AND METHOD OF DYNAMICALLY ADJUSTING A MULTI-CLUSTER MEMORY BUFFER

TECHNICAL FIELD

The present invention generally relates to radio frequency (RF) receivers and, more particularly, to a digital RF receiver and method of storing buffered data for use in correcting data received in signal broadcasts.

BACKGROUND OF THE INVENTION

Automotive vehicles are commonly equipped with various signal communication devices in the form of audio radios for receiving broadcast radio frequency (RF) signals, processing the RF signals, and broadcasting audio data (e.g., music) to passengers in the vehicle. Satellite digital audio radio (SDAR) services are available that offer digital radio service covering a large geographic area, such as North America. Currently, a couple of SDAR services are available in North America. One such SDAR service is referred to as Sirius satellite radio, which has three satellites in elliptical orbit. Another example of an SDAR service is XM satellite radio, which has two satellites in geo-stationary orbit. These SDAR services receive uplinked programming which, in turn, is rebroadcast directly to digital radios that subscribe to the service. Each subscriber to the SDAR service generally employs a digital radio having a receiver and an antenna for receiving the broadcast digital signals.

With SDAR service, the radio receivers are generally programmed to receive and decode the digital data signals, which typically include many channels of digital audio. In addition to broadcasting the encoded digital quality audio signals, the SDAR service may also transmit data that may be used for various other applications. For example, the broadcast signals may include data information for advertising, informing the driver of warranty issues, providing information about the broadcast audio information, and providing news, sports, and entertainment broadcasting, as well as other data information. Thus, the digital broadcast may be employed for any of a number of satellite audio radio, satellite television, satellite Internet, and various other consumer services.

Some SDAR services, such as Sirius satellite radio, use a time slicing technique to minimize the amount of data that is buffered in order to take advantage of an approximately four second memory buffer. One example of a conventional digital RF receiver system 100 is shown in FIG. 1 employing an antenna 112 and a digital RF receiver 114 providing an output to user input/output (I/O) device(s) 116. In the conventional receiver system 100, an RF tuner 118 generally provides certain select frequency signals to a digital demodulator 120 which separates the received signals from the various sources, such as first and second satellites, labelled SAT1 and SAT2, and a terrestrial transmission source labelled TERR. Signals from the sources SAT2 and TERR are processed by a maximum ratio combiner 124 and then are further processed by forward error correction circuitry 126 before passing onto the source decoder 128. The receiver 114 output is then made available to user I/O devices 116. Signals from the first source SAT1 may be temporarily stored (buffered) in a memory buffer 122 and the stored data may be read and combined with the signals from sources SAT2 and TERR in the maximum ratio combiner 124. The memory buffer 122 stores a cluster of data that may be made available in a buffered signal for correction of the signal broadcast in the forward error correction circuitry 126.

In some conventional systems, the receiver system typically buffers one cluster of data out of potentially multiple clusters of data that are transmitted. To take advantage of the maximum ratio combining, the cluster data is typically in the form of soft bits, i.e., the system buffers the I and Q data bits as a quantized signal, which is a digitized analog signal. The buffered signal can then be time aligned and combined with the other quantized signals.

In the Sirius satellite radio system, all the clusters are demodulated, however, the data clusters that are not used are generally dropped. While this approach works well for conventional receiver systems that provide either audio data or non-audio data only, it poses problems for systems that employ audio and non-audio data information from different clusters. Data clusters from multiple sources for such systems would require employment of separate digital chip sets to store both audio and non-audio data simultaneously which would result in added components (e.g., increased memory chip sets) and increased cost of the system.

It is therefore desirable to provide for an RF digital receiver that efficiently buffers data received from multiple sources. In particular, it is desirable to provide for a digital radio receiver that buffers audio data and other data information broadcast from multiple sources without requiring additional duplicative memory chip sets, thus providing a cost-effective approach to buffering data in a digital radio system.

SUMMARY OF THE INVENTION

In accordance with one aspect of the present invention, a digital radio receiver system is provided for receiving signals from at least a first source and providing dynamic data buffering. The system includes an antenna for receiving signals from at least a first source, a tuner for selecting certain frequency signals, and a digital demodulator for demodulating the tuned selected signals. The system also includes a memory buffer having memory locations and capable of storing data clusters including at least a first cluster having a first number of bits of data of a first type received from a first source and a second cluster having a different second number of bits of data of a second type received from the first source. The system further has a controller for controlling the storing of data clusters in the memory buffer. The controller selects one of first and second clusters of data.

According to another aspect of the present invention, a method of dynamically buffering data received from at least a first source with a single memory buffer is provided. The method includes the steps of receiving signals from at least a first source and storing a cluster of data in a memory buffer. The cluster of data comprises at least a first cluster having a first number of bits of data of a first type received from the first source and a second cluster having a different second number of bits of data of a second type received from the first source. The method also includes the step of dynamically changing the cluster of data from the first cluster to the second cluster. The method further includes the step of storing the selected cluster in the memory buffer.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
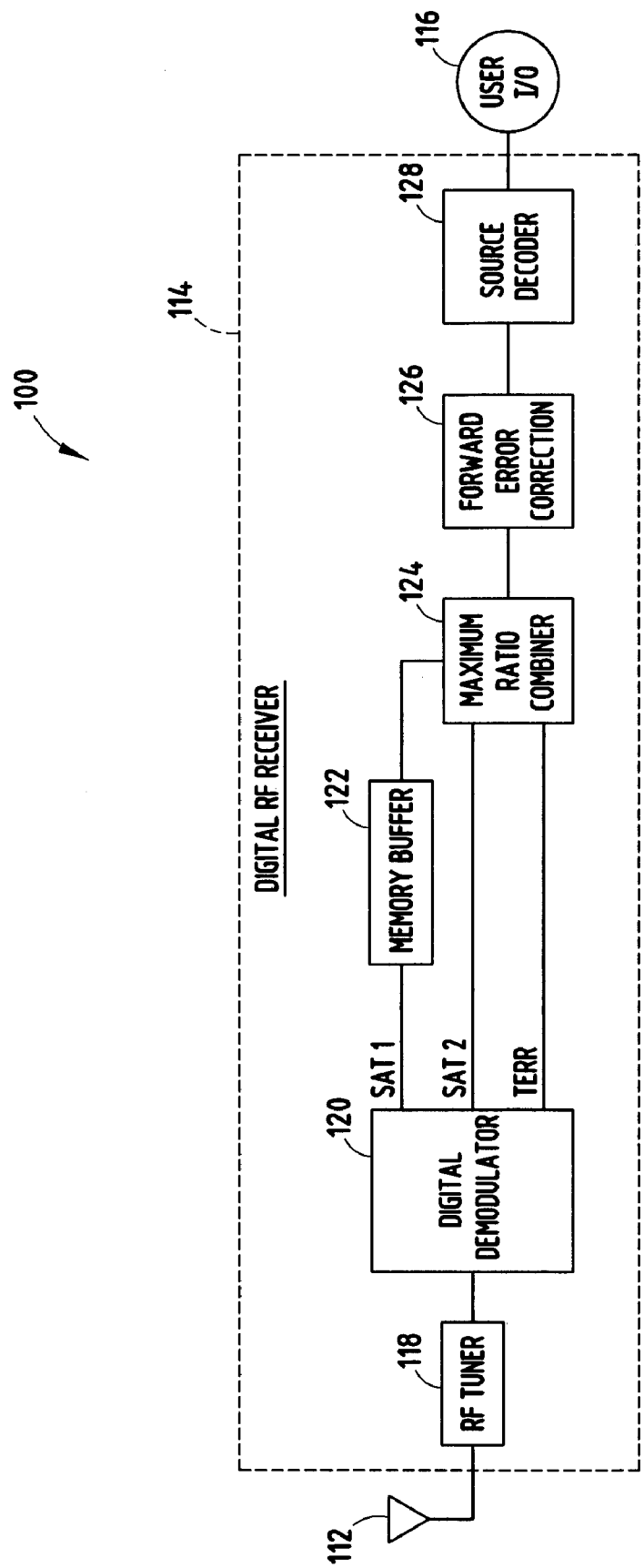
FIG. 1 is a block diagram illustrating a conventional digital RF receiver system with conventional memory buffering.
Figure 2:
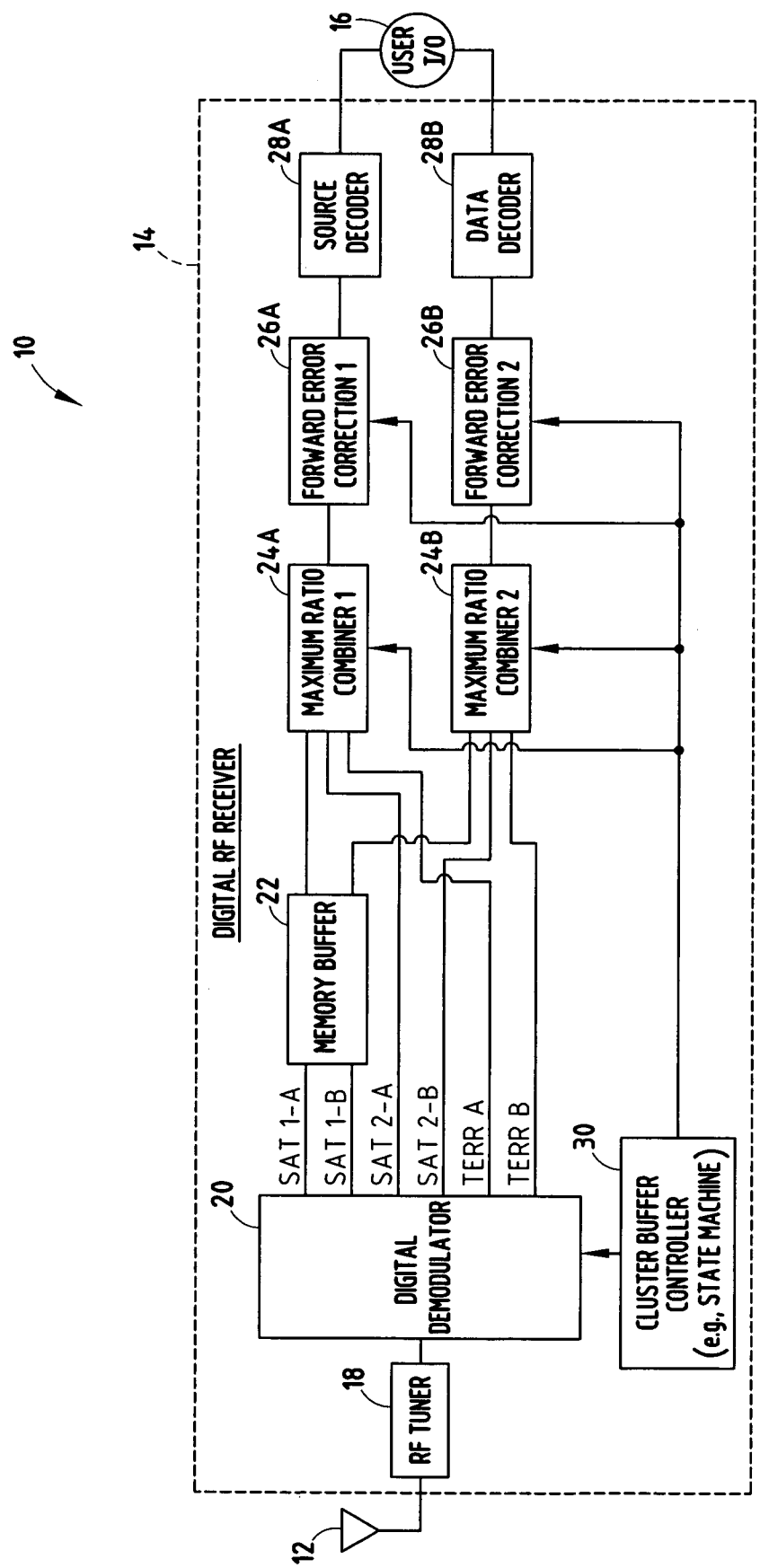
FIG. 2 is a block diagram illustrating a digital RF receiver system for processing broadcast data and storing buffered data in a dynamically adjustable memory buffer, according to the present invention.

Referring to FIG. 2, a digital radio frequency (RF) receiver system 10 is generally illustrated for receiving RF signal broadcasts containing a stream of broadcast data and buffering data according to the present invention. The receiver system 10 is described in connection with receiving signals from a satellite digital audio radio (SDAR) service which may be used to provide any of a number of consumer services including radio, television, Internet, and other data broadcast services. Currently, two commercially available SDAR service systems are in place in North America and are referred to as Sirius satellite radio and XM satellite radio, both of which employ at least two satellites for transmitting streams of digital data to subscribers. The RF signal broadcast could also be transmitted via terrestrial and/or other satellite-based RF broadcast services. The digital RF receiver system 10 is well-suited to be employed on a vehicle and receives audio and data information from multiple sources.

The digital RF receiver system 10 includes an antenna 12 which may be mounted on a vehicle or other device for receiving digital RF signals from multiple sources, such as satellite and/or terrestrial-based signal broadcasts. The antenna 12 may include one or more antenna elements as is conventionally known in the art. It should be appreciated that any of a number of antennas and antenna arrangements may be employed on various locations on a vehicle or other device for receiving and/or transmitting signals to wirelessly communicate with multiple remote satellites and/or terrestrial-based communication devices.

In the embodiment shown and described herein, the antenna 12 and digital RF receiver 14 receive RF signals from multiple digital transmission sources, which include a first satellite transmission source, identified as SAT1, a second satellite transmission source, identified as SAT2, and a terrestrial-based transmission source identified as TERR. Conventional SDAR services are known to include at least two satellite broadcasts and may include a terrestrial broadcast to provide supplemental data transmission, particularly when signal blockage may be present. Each of the transmission sources may broadcast data of a first type, such as audio data, and may further broadcast data of a second type, such as non-audio data which may include navigation, news, and other information. The audio data of the first type is also referred to herein as the primary data, while the non-audio data of the second type is also referred to herein as secondary data.

The receiver system 10 also has digital RF receiver 14 having an input for receiving the RF signals from the antenna 12. The digital RF receiver 14 has an output that communicates with one or more user input/output (I/O) interface devices 16. User interface output devices may include an audio output device (e.g., speaker) a visual output device (e.g., display) or other output device(s). User interface input devices may include a voice recognition input device, a keypad or other user inputs.

The digital RF receiver 14 is configured to receive and process broadcast digital data signals received by the antenna 12. The digital radio receiver 14 includes an RF tuner 18 receiving as an input the RF signals received by the antenna 12. The RF tuner 18 selects a frequency bandwidth to pass select RF signals within a tuned frequency bandwidth. The digital RF receiver 14 also includes a digital demodulator 20 for demodulating and extracting time division multiplexed (TDM) digital data from multiple transmission sources.

The digital demodulator 20 provides data streams for each of the transmission sources. The data streams include primary audio data of the first type identified as SAT1-A and secondary data SAT1-B, both broadcast from the first satellite transmission source SAT1. The data stream also includes primary audio data SAT2-A and secondary data SAT2-B, both broadcast from the second satellite transmission source SAT2. The data stream further includes primary audio data TERRA and secondary data TERRB, both broadcast from the terrestrial-based transmission source.

The digital RF receiver 14 employs a memory buffer 22 which, according to the present invention, has memory locations capable of storing multiple data clusters containing data broadcast in signals. The data clusters are packets of data and are also referred to as data packets or frames. The data clusters include at least first and second data clusters containing different numbers of bits of select first and second data types, such as the primary data and the secondary data. The memory buffer 22 may include a conventional memory chip set such as SRAM or SDRAM having eight bit memory storage locations. In one embodiment, each memory location has the same size memory buffer for storing a set of X number of bits of data. The allocation of the X number of bits within each memory location may be changed to use a select number of bits for the primary audio data, depending on strength of the received signal from the first transmission source. The allocation of X number of bits dedicated to the primary audio data may be pre-selected by design or user preference. The remaining number of bits may be used for the secondary data.

Also included in the digital RF receiver is a cluster buffer controller 30 for controlling the memory buffer 22. The controller 30 controls the storage and reading of the cluster of data stored in the memory buffer 22 and selects one of the at least first and second clusters of data. This may be achieved with a dynamic selection based on signal strength, such as signal-to-noise ratio (SNR) of a received buffer source (e.g., SAT1) signal. According to one embodiment, the cluster buffer controller 30 may include a state machine employing discrete circuitry. However, it should be appreciated that the controller 30 may include alternative control circuitry including a microprocessor-based controller.

The memory buffer 22 is shown receiving demodulated data transmitted in signals broadcast by the first satellite transmission source SAT1. The data included in the signal SAT1 includes multiple data types shown as primary data SAT1-A, which may represent audio data, and secondary SAT1-B, which may represent other data such as messages for navigation, etc., received from the first source SAT1. Data received from the first source during a predetermined time period, such as four seconds, is stored in the memory buffer 22 as a cluster of data as described herein.

The demodulated streams of data in signals received from transmission sources SAT2 and TERR and the buffered data from source SAT1 are passed onto first and second maximum ratio combiners 24A and 24B, which combine the current received demodulated signals with the buffered data clusters. Forward error correction circuitry 26A and 26B is able to correct the data transmission, such as the primary audio or secondary data, by correcting data that may have been corrupted (e.g., due to noise, interference or signal blockage) in the transmission or reception from one or more transmission sources (e.g., SAT2/SAT1/TERR). The corrected data is then passed onto a source decoder 28A and/or data decoder 28B for use with any of a number of user I/O devices 16.

Figure 3:
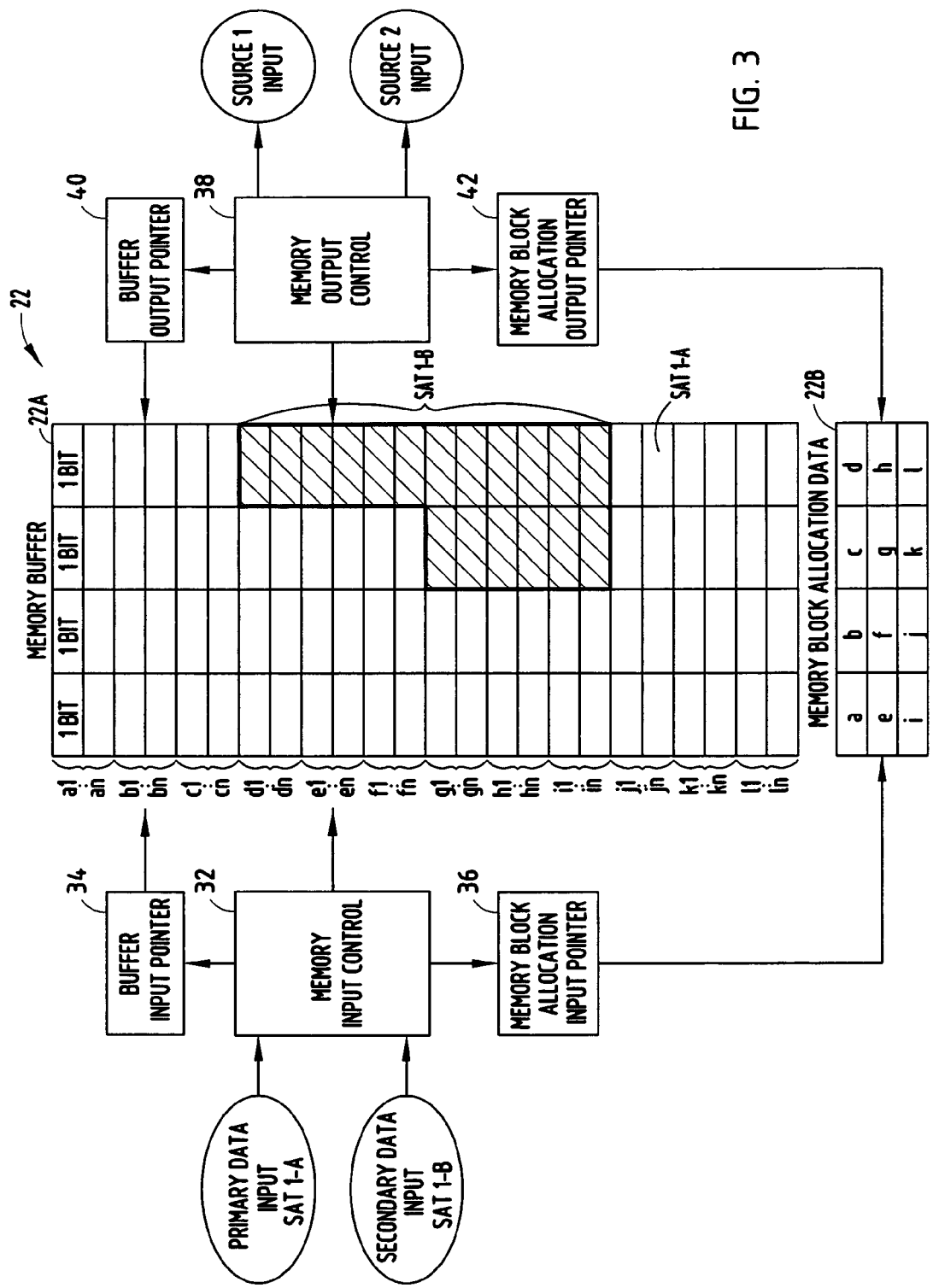
FIG. 3 is a block diagram illustrating the selection and control of the memory buffer according to the present invention.

Referring to FIG. 3, the memory buffer 22 is illustrated in greater detail in conjunction with certain features of the discrete circuitry controller 30. The controller 30 may include a buffer input pointer 34, a memory input control 32, and a memory block allocation input pointer for controlling the inputting of data into memory buffer 22. Similarly, the controller 30 may include a buffer output pointer 40, a memory output control 38, and a memory block allocation output pointer 42 for reading data stored in the memory buffer 22. Input data received from multiple cluster sources, such as SAT1-A and SAT1-B, are processed by the memory input control 32 which allocates clusters of data to the memory buffer 22 via the buffer input pointer 34.

The memory block allocation input pointer 36 identifies the bit allocation format for the block of data stored within a certain location 22A (e.g., block a including data lines a1-an) in memory buffer 22 by way of memory block allocation data 22B. In one embodiment, each memory block 22B includes two bits of data. The memory block allocation data 22B identifies the bit allocation format of the memory data blocks provided in each of the certain locations 22A in memory buffer 22. The memory blocks a through l store the buffered data clusters.

According to one example, the data stored in individual memory blocks a-l of memory buffer each have n lines (rows) of four bits of data per block. The data includes four bits of primary data 1 (e.g., primary audio data in SAT1-A) and zero bits of secondary data (e.g., secondary data in SAT1-B) to form a first block of data (e.g., block a). According to a second block of data (e.g., block d), the data stored in memory buffer 22A may include three bits of primary data and one bit of secondary data. According to a third block of data (e.g., block g), the data stored in memory buffer 22A may include two bits of primary data and two bits of secondary data.

It should be appreciated that the controller 30 may dynamically change the bit allocation of the memory blocks, which may occur based on strength of signal of at least one of the transmission sources (e.g., SAT1-A). If the first transmission source SAT1 is strong, then the bit allocation for the memory blocks may include two bits of primary data SAT1-A and two bits of secondary data SAT1-B. However, if the signal-to-noise ratio of first source SAT1 is weak, the bit allocation for the memory blocks may employ all four bits of primary data SAT1-A, thereby not storing secondary data SAT1-B. This is a compromise in that the secondary data SAT1-B is not stored in the memory buffer 22 as a backup, however, the primary data SAT1-A is buffered at a greater resolution. Thus, certain data, such as audio radio data, may be buffered at a higher resolution when the signal strength of the transmitted signal is weak.

The data stored within memory buffer 22A is subsequently retrieved by way of the memory output control 38 which employs the buffer output pointer 40 and the memory block allocation output pointer 42 to supply the primary data SAT1-A and secondary data SAT1-B as output data. The exported data is recombined with other signals broadcast when needed.

Figure 4:
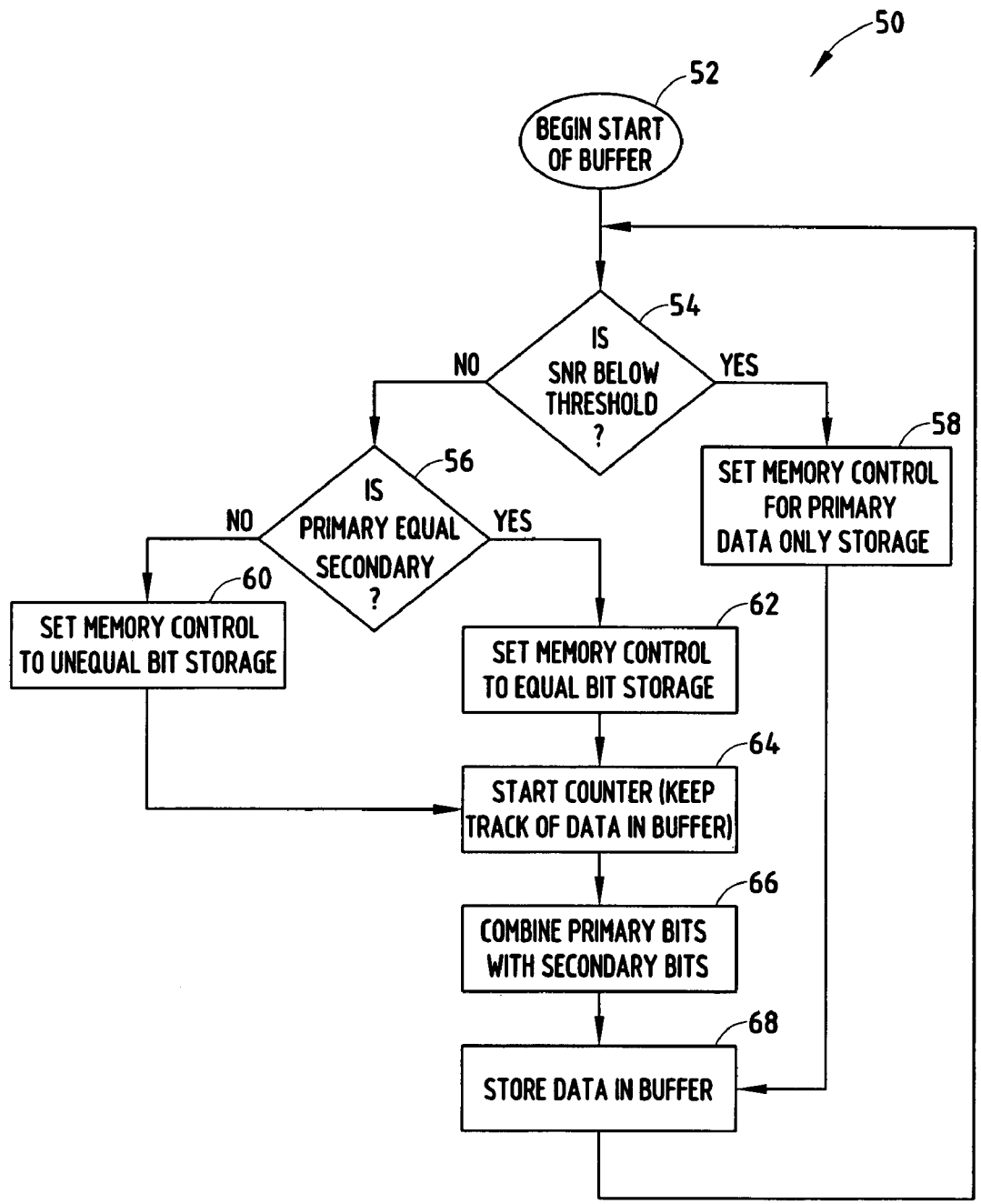
FIG. 4 is a flow diagram illustrating a routine for dynamically controlling the memory buffer and entering clusters of data into the memory buffer.

Referring to FIG. 4, a routine for storing the data clusters in memory buffer 22 is illustrated therein. Routine 50 begins at step 52 and proceeds to decision step 54 to determine if the signal-to-noise ratio (SNR) is below a certain threshold and, if not, proceeds to decision block 56 to determine if the primary data (e.g., SAT1-A) should be equal (in desired performance) to the secondary data (e.g., SAT1-B). If the primary data should not be equal (in desired performance) to the secondary signal, routine 50 will set the memory control to an unequal bit storage (e.g., three bits of primary data SAT1-A and one bit of secondary data SAT1-B) in block 60, and then proceed to block 64. If the primary data is equal to the secondary data, routine 50 will set the memory control bit to equal bit storage (e.g., two bits of primary data SAT1-A and two bits of secondary data SAT1-B) in block 62 and then proceed to step 64 to start a counter to keep track of data in the memory buffer.

Following step 64, routine 50 will combine the primary bits with the secondary bits in step 66 and store the data in the memory buffer in step 68 before repeating. If the signal-to-noise ratio is below the threshold in step 64, routine 50 will proceed to set the memory control for the primary data already stored in step 58, and then proceed to store the cluster of data in the memory buffer in step 68 before returning (e.g., four bits of primary data SAT1-A and zero bits of secondary data SAT1-B). Accordingly, the clusters of data stored in the memory buffer are selected based on a signal-to-noise ratio threshold, according to one embodiment.

Figure 5:
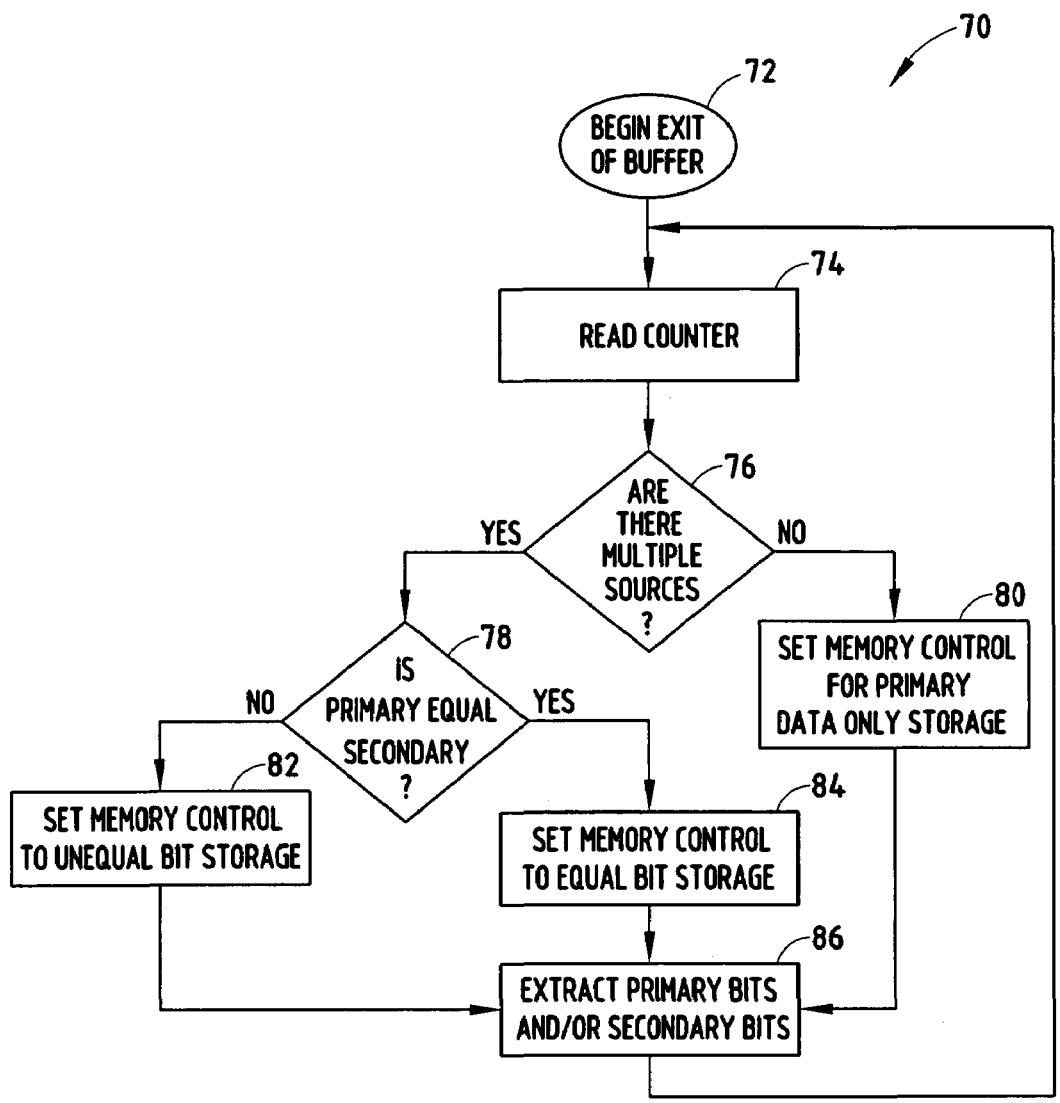
FIG. 5 is a flow diagram illustrating a routine for reading data from the memory buffer.

Referring to FIG. 5, the reading and exportation of data from the memory buffer 22 is illustrated according to routine 70. Routine 70 begins at step 72 and proceeds to read a counter in step 74, and then proceeds to decision step 76 to determine if there are multiple signal sources available. If multiple sources are not available, routine 70 will set the memory control for the primary data only storage in step 80, and then proceed to step 86 to extract the primary bits and/or secondary bits before returning.

If there are multiple signal sources available, routine 70 will proceed to decision step 78 to determine if the primary data (e.g., SAT1-A) should be equal to the secondary data (e.g., SAT1-B). If the primary data should not be equal to the secondary data, routine 70 will set the memory control to unequal bit storage (three bits of primary data SAT1-A and one bit of secondary data SAT1-B) in step 82, and then proceed to step 86 to extract the primary bits and/or secondary bits before returning. If the primary data should be equal to secondary data, routine 70 will proceed to step 84 to set the memory control to equal bit storage (two bits of primary data SAT1-A and two bits of secondary data SAT1-B), and then proceed to step 86 to extract the primary bits and/or secondary bits before returning.

Accordingly, the digital RF receiver system 10 and method of the present invention advantageously stores and processes signals broadcast from multiple sources and provides a memory buffer that stores data from selected clusters that may be useful to recapture data during a signal broadcast that may otherwise be missed. The present invention advantageously selects from a plurality of data clusters which provides for adaptive data collection. It should be appreciated that enhanced and more flexible signal reception is achieved without requiring added memory chips sets and cost.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A digital radio receiver system for receiving signals and having a memory buffer, said system comprising:
    an antenna for receiving signals from at least a first source;
    a tuner for selecting certain frequency signals;
    a digital demodulator for demodulating the tuned selected signals;
    a memory buffer having memory locations and capable of storing data clusters comprising at least a first cluster comprising a first number of bits of data of a first type received from the first source and a second cluster comprising a different second number of bits of data of a second type received from the first source; and
    a controller for controlling the storing of data clusters in the memory buffer, said controller selecting one of at least first and second clusters of data, wherein the controller selects one of the first and second clusters as a function of strength of a signal from the first source.

2. The system as defined in claim 1, wherein the controller selects only the first cluster when the signal received from the first source is weak, and selects both the first and second clusters when the signal received from the first source is strong.

3. The system as defined in claim 2, wherein the controller determines if the signal received from the first source is either weak or strong by comparing the strength of the received signal to a threshold.

4. The system as defined in claim 3, wherein the threshold is a signal-to-noise ratio.

5. The system as defined in claim 1 further comprising forward error correction circuitry for correcting data as a function of the cluster data stored in the memory buffer.

6. The system as defined in claim 5 further comprising a decoder for decoding the corrected signal.

7. The system as defined in claim 6, wherein the decoder comprises a source decoder and a data decoder.

8. The system as defined in claim 5 further comprising a maximum ratio combiner for combining the stored data with non-buffered data.

9. The system as defined in claim 1, wherein the digital radio receiver system is located on a vehicle.

10. A method of buffering data received with a single memory buffer, said method comprising the steps of:
    receiving signals from at least a first source;
    storing a cluster of data in a memory buffer, said cluster of data comprising at least a first cluster having a first number of bits of data of a first type received from the first source and a second cluster having a different second number of bits of a second type received from the first source;
    adjusting the number of bits of data for the cluster of data allocated to the first cluster and the second cluster; and
    storing the adjusted cluster of data in the memory buffer, wherein the step of adjusting the number of bits of data comprises comparing the strength of a signal from the first source to a signal strength threshold and changing the cluster of data as a function of the comparison.

11. The method as defined in claim 10 further comprising the step of reading the stored first and second clusters of data.

12. The method as defined in claim 11 further comprising the step of correcting the data by combining the stored clusters of data with non-buffered data.

13. The method as defined in claim 10, wherein the step of adjusting the number of bits comprises setting the number of bits allocated to the first cluster to a first number of bits when the signal received from the first source is weak and setting the number of bits allocated to the second cluster to a second different number when the signal received from the first source is strong.

14. The method as defined in claim 10, wherein the signal strength threshold is a signal-to-noise ratio.

15. The method as defined in claim 10, wherein the method is employed on a vehicle radio receiver.

* * * * *